United States Patent [19]
Fournie

[11] 3,738,741
[45] June 12, 1973

[54] SLIDE PROJECTOR

[76] Inventor: Thomas A. Fournie, 6805 Zumirez Drive, Malibu, Calif. 90265

[22] Filed: June 30, 1970

[21] Appl. No.: 51,155

[52] U.S. Cl. .................. 353/20, 353/89, 353/83
[51] Int. Cl. ........................................... G03b 21/14
[58] Field of Search ................... 353/8, 20, 82, 83, 353/90, 93, 94, 86; 350/159

[56] References Cited
UNITED STATES PATENTS

| | | | |
|---|---|---|---|
| 887,839 | 5/1908 | Patterson | 353/90 |
| 2,123,743 | 7/1938 | Pratt | 353/20 |
| 2,249,061 | 7/1941 | Styll | 353/20 |
| 2,937,563 | 5/1960 | Ranft | 350/159 |
| 3,218,919 | 11/1965 | Starner | 353/20 |
| 3,218,920 | 11/1965 | Johnson | 353/83 |

Primary Examiner—Leonard Forman
Assistant Examiner—A. J. Mirabito

[57] ABSTRACT

Disclosed is a slide projector having means for polarizing the light projected therefrom. The projector may be arranged to selectively project one or more slides and the polarizing means are selectively operable to control the intensity of the slide image or images projected, thereby to permit the image of a slide to be selectively developed on a viewing screen and dissolved therefrom. Further, the polarizing means may be arranged so that a dissolve type transition may be accomplished on a viewing screen from the projection of the image of one slide to the projection of the image of another.

12 Claims, 5 Drawing Figures

PATENTED JUN 12 1973 3,738,741

INVENTOR.
Thomas A. Fournie

SLIDE PROJECTOR

The present invention relates to slide projectors and more particularly to a novel type of slide projector which projects polarized light. By use of suitable polarizing means in the novel projector, a dissolve type slide projecting means may be formed. As used herein, the term dissolve refers to the act of gradually fading out or dimming the entire image of a slide projected on a viewing screen until the image of the slide is no longer perceptible.

Heretofore, it has been found desirable to construct slide projector systems having the capability of selectively projecting the image of one or the other of two slides on a viewing screen. One such prior art projector system accomplished the selective change from one slide to another by simultaneously shuttering the light beam illuminating a slide being projected while unshuttering a second light beam to project the image of a second slide. A disadvantage, however, inherent with this type of projector system was that a line-wipe effect appeared on the viewing screen as a result of the shuttering and unshuttering of the light beams. Such projector systems are referred to herein as line-wipe type slide projectors since the image of the slide being shuttered appears to be wiped off the viewing screen instead of being dissolved therefrom.

Because line-wipe effects on a viewing screen are disturbing to viewers, dissolve type projector systems have generally been considered preferable to line-wipe type projectors. Prior to this time, it has been necessary to employ two slide projectors in order to provide a true dissolve type projection system. One projector was operated to gradually dissolve the image of a slide being projected from the viewing screen while the other projector system was operated to develop the image of a second slide over the slide image being dissolved. Such projector systems are commonly referred to as lap-dissolve type slide projector systems since the image being developed on the viewing screen laps over the image being dissolved therefrom. An obvious disadvantage, however, with such a projector system is the expense since two entire slide projectors are required along with means for simultaneously controlling their operation.

It is, accordingly, an object of the present invention to provide a novel dissolve type slide projector which is characterized by utilizing polarized light.

It is further an object of the present invention to provide a novel dissolve type slide projector which is characterized by utilizing polarized light and which is selectively operable to dissolve the image of a slide from a viewing screen while simultaneously developing the image of another slide thereon.

It is, additionally, an object of the present invention to provide a novel dissolve type slide projector which is characterized by utilizing polarized light and which is selectively operable to project one or more slides simultaneously on a viewing screen.

It is another object of the present invention to provide a novel slide projector which is characterized by utilizing polarized light.

In accomplishing these and other objects, there has been provided in accordance with the present invention a dissolve type slide projector having a light source arrangement which produces first and second light beams. First and second slides are supported in the projector and are illuminated by the first and second light beams, respectively. First and second polarizing means are provided for plane polarizing, respectively, the first and second light beams and a third plane polarizing means is provided for determining the polarization orientation of light projected on a viewing screen. Several embodiments of the projector are shown and/or described, suggesting various arrangements for the positioning of the first, second and third polarizing means. Further, one or more of the first, second and third polarizing means may include rotatably mounted polarizing elements, thereby to permit the control of which slide image or images are projected on the viewing screen by the relative positioning of these rotatable polarizing elements. For example, the first and second polarizing means may be positioned to polarize the first and second light beams 90° apart, and the third polarizing means may be operated by rotating its rotatable polarizing element or elements to develop the image of one slide on the viewing screen while dissolving the image of the other slide therefrom, or vice versa. Thus, there is provided a novel dissolve type slide projector which is characterized by using polarized light and is selectively operable to develop the image of a slide on a viewing screen and dissolve it therefrom.

A better understanding of the present invention may be had from the following detailed description when read in conjunction with the accompanying drawings, in which.

Figure 1:
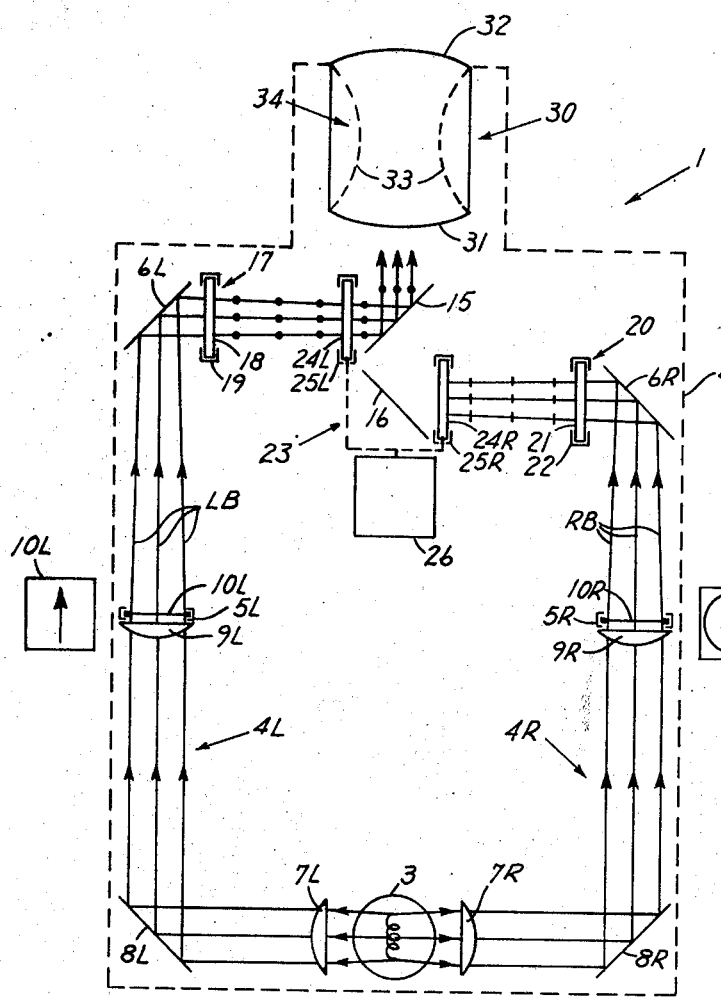
FIG. 1 is a plan view of a slide projector according to the present invention illustrating the arrangement of the optical elements therein.

Referring to the drawings in more detail, there is shown in FIG. 1 a slide projector generally indicated by the numeral 1. The projector 1 has a housing 2, shown in broken lines, a light source means 3 and a projection lens system or means 30. The projection lens 30 has conventional entrance and exit lens 31 and 32 which define its entrance and exit pupils, respectively. The effective optical path for light rays through the lens 30 is indicated by broken lines designated 33 and the narrowest portion of this path 33 defines the aperture 34 of the lens 30. The light source 3 is preferably mounted centrally at the rear of the housing 2, and the projection lens 30 is preferably mounted centrally at the front of the housing 2. Thereby, the projection lens 30 and light source 3 are positioned in line along the centerline of the projector 1 with the optical axis of the projection lens 20 extending along the centerline of the projector 1. Positioned on the right and left handed sides of the projector 1 are substantially identical light directing systems or means for receiving light from the light source 3, forming the light into a light beam, illuminating a slide, and directing the light illuminating the slide to the entrance pupil of the projection lens 30. Since each of these light directing systems are substantially identical, their corresponding optical components are designated by the same numerals with a suffix L or R to indicate whether an optical component is a part of the left or right handed light directing system, respectively.

Describing now the aforementioned left and right handed light directing systems, each system includes a condensing lens means 4, a slide holding means 5 and a plane reflecting mirror 6. Each condensing lens means 4 has an entrance lens 7, a plane reflecting mirror 8 and an exit lens 9. The condensing lens means 4L and 4R are placed symmetrically to the left and right, respectively, of the light source 3 in order to collect light therefrom and form first and second converging, but mutually parallel light beams LB and RB. The designation LB indicates left-handed light beam while the designation RB indicates right-handed light beam.

In the formation of the light beams LB and LR by the condensing lens systems 4L and 4R, respectively, the lens 7 which are positioned just to the left and right of the light source 3 collect light from the source 3 and form a pair of parallel-rayed light beams which are each projected away from the light source 3 at substantially an angle of 90° to the centerline of the projector 1. The plane mirrors 8 are positioned in line with the alinement of the light source 3 and their respective lens 7 and at an angle of 45° thereto. Each mirror 8 is substantially totally reflecting and reflects the parallel-rayed light beams projected from the lens 7 towards the front of the projector 1 along light paths parallel to the centerline of the projector 1. The exit lens 9 are mounted on the housing 2 symmetrically on each side of the centerline of the projector 1 in the light paths of the light beams reflected from the mirrors 8. The lens 9L and 9R form the parallel-rayed light beams reflected from the mirrors 8 into the converging light beams LB and LR, respectively. For reasons hereinafter explained, the light beams LB and LR are made to converge so that an image of the light source 3 is formed at substantially the aperture 34 of the projection lens 30.

The slide holding means 5L and 5R are mounted symmetrically with respect to the centerline of the projector 1 on the left and right sides of the housing 2 forward of and adjacent to the lens 9L and 9R, respectively. Each holding means 5 is constructed to hold a photographic slide or transparency 10 inserted therein across the light path of the respective light beams LB and RB. It is noted that the condensing lens means 4L and 4R are constructed so that the light beams LB and RB formed thereby illuminate substantially the entire image area of the slides 10L and 10R positioned in the holding means 5L and 5R, respectively. As shown in FIG. 1, the exemplary slides 10L and 10R inserted in the holding means 5L and 5R have an ARROW and CIRCLE thereon, respectively.

Mounted in the housing 2 across the centerline of the projector 1 and adjacent to the entrance lens 31 of the projection lens system 30 is a beam-splitting mirror means 15. The beam-splitting means 15 may be of any suitable conventional type, such as multiple film or multiple layer mirrors, an arrangement of prisms or a pellicle type beam-splitter, and is preferably operable to divide a light beam into two parts of equal intensity, i.e., to reflect 50 percent of a light beam while transmitting the remaining 50 percent. The beam-splitter 15 has its plane reflecting surfaces positioned at an angle of 45° with respect to the centerline of the projector 1 and the optical axis of the projecting lens 30. The beam-splitter 15 has front and back plane reflecting surfaces which each transmit 50 percent and reflect 50 percent of a light beam. The beam-splitter 15 is positioned so that its front reflecting surface receives light from the left-handed side of the projector 1, i.e., the light beam LB, and that its back reflecting surface receives light from the right-handed side of the projector 1, i.e., the light beam RB.

Positioned adjacent to and behind the beam-splitter 15 is a plane mirror or reflecting means 16. The mirror 16 is mounted in the housing 2 across the centerline of the projector 1 at an angle of 45° with respect to the centerline of the projector 1. The plane reflecting surface of the mirror 16 faces forward and to the right in order to receive light from the right-handed side of the projector 1 and reflect it forward to the back reflecting surface of the beam-splitter 15.

The plane reflecting mirrors or reflecting means 6L and 6R are mounted in the housing 2 to project the light beams LB and RB from the slides 10L and 10R to the beam-splitter 15 and the mirror 16, respectively. Accordingly, the plane mirror 6L is mounted on the left side of the housing 2 in line with the lens 9L and slide holding means 5L and also in line with the beam splitter 15, with the plane reflecting surface of the mirror 6L facing and parallel with the front reflecting surface of the beam-splitter 15. The plane mirror 6R is similarly mounted on the right side of the housing 1 in line with the lens 9R and slide holding means 5R and also in line with the plane mirror 16. The plane reflecting surface of the mirror 6R faces and is parallel with the plane reflecting surface of the mirror 16. It is noted that reflecting surfaces of the mirrors 6L, 6R and 16 are preferably each substantially totally reflecting.

Positioned adjacent the mirror 6L and between it and the beam-splitter 15 is a first polarizing means 17. The polarizing means 17 includes a polarizer element or component 18 rotatably mounted in mounting means or guides 19. The guides 19 are mounted in the housing 2 to hold the polarizer 18 across the light path of the beam LB, thereby the beam LB is plane polarized by the polarizer 18. As indicated in FIG. 1, the polarizer 18 is positioned or orientated in the guides 19 to polarize the light beam LB in a sense, i.e., at a polarization angle, which is designated 0° polarization. The light rays of the beam LB are therefore marked with dots after the beam has been polarized by the polarizing means 17.

Positioned on the right-handed side of the projector 1 adjacent the mirror 6R and between the mirrors 6R and 16 is a second polarizing means 20. The polarizing means 20 includes a polarizer element or component 21 rotatably mounted in mounting means or guides 22. The mounting means 22 is mounted in the housing 2 to hold the polarizer 21 across the light path of the beam RB. The polarizer 21 is positioned or oriented in the mounting means or guides 22, as indicated in FIG. 1, to plane polarize the light beam RB in a sense, i.e., at a polarization angle, 90° different from the polarization of the beam LB. The light rays of the beam RB are therefore marked with crosses after the beam has been polarized by the polarizing means 20.

In order to control the polarization of light transmitted to the projection lens 30 and, thus, transmitted thereby, a third polarizing means 23 is mounted in the housing 2. The polarizing means 23 includes a left-handed plane polarizer element 24L rotatably mounted in mounting means or guides 25L and a right-handed plane polarizer element 24R rotatably mounted in mounting means or guides 25R. The mounting means 25L is mounted in the housing 2 to support the polarizer 24L in a position across the light path of the beam LB between the polarizer means 17 and the beam-splitter 15. The mounting means 25R, in turn, is mounted in the housing 2 to support the polarizer 24R in a position across the light path of the light beam RB between the polarizer means 20 and the mirror 16. Also, included in the polarizer means 23 is a conventional control means 26. The control means 26 may be any conventional arrangement, such as mechanical means, mechanical-electrical means, or otherwise, and is connected to the polarizer elements 24L and 24R, as indicated by dashed lines, for selectively rotating the elements 24. The polarization orientations of the polarizers 24L and 24R are preferably alined and the control means 26 is preferably operable to selectively rotate both of the elements 24 at the same time in a coordinate action so the elements 24L and 24R stay in alinement during rotation.

It is here noted that the polarizer elements or components 18, 21, 24L and 24R may each be made in any suitable conventional manner, such as by forming polarizer sheets from polarizing crystals or using other suitable polarizing means. For a further discussion of polarizing means, see Jenkins and White, Fundamentals of Optics, pp. 494–496, McGraw-Hill Book Company, (3rd Ed. 1957). Further, each polarizer element or component could be made up of a plurality of polarization devices in sheets, layers or other arrangements.

Figure 2A:
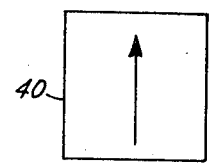
FIGS. 2a–2c are front elevation views of a viewing screen showing images of the slides positioned in the projector of FIG. 1 projected thereon.
Figure 2B:
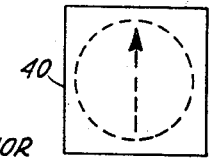
Figure 2C:
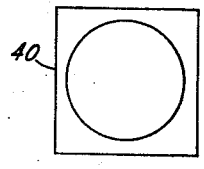

In operation, the slide projector 1 is extremely versatile and is selectively operable to project the image of the slide 10L and/or the image of the slide 10R on a selected viewing area defined by a viewing screen 40, as shown in FIGS. 2a, 2b and 2c. To illustrate, the operation of projecting the image of the slide 10L on the viewing screen 40 is first explained. In this explanation, it is assumed that the polarizers 24L and 24R are orientated with respect to the light beams LB and RB to only transmit light rays polarized at 0°, as shown in FIG. 1, where 0° polarized light rays marked by dots are shown being transmitted through the polarizer 24L while 90° polarized light rays marked by crosses are shown attenuated by the polarizer 24R.

To project the image of the slide 10L on the screen 40, the polarizer 18 is orientated to pass 0° polarized light rays, as it is shown in FIG. 1. The projector 1 then functions as a slide lantern with the condenser means 4L and light source 3 providing the light beam LB for illuminating the image area of the slide 10L positioned in the slide holding means 5L. The condenser 4L is of a conventional type being a large aperture short focus lens system which is operable to form an image of the filament of the light source 3 at the aperture 34 of the projection lens 30. The light beam LB is projected from the condenser lens 9L and through the slide 10L. From the slide 10L, the light beam LB is reflected from the mirror 6L and to the polarizing means 17 whereat the beam LB is polarized at 0° polarization by the polarizer 18. The 0° polarized beam is then transmitted through the polarizer 24L since the orientation of the polarizer 24L is at 0° and a predetermined percentage of the intensity of the beam LB is reflected by the beam-splitter 15 to the projection lens 30. The projection lens 30 then projects a magnified real image of the ARROW on the slide 10L on the viewing screen 40, as shown in FIG. 2a. It is noted that the focal length of the projection lens 30 is governed by the size of the image desired and the distance to the viewing screen 40.

To dissolve the image of the slide 10L from the screen 40, the orientation of either of the polarizers 18 or 24L may be selectively changed. Considering first the effect of changing the orientation of the polarizer 18, the intensity of the image of the ARROW on the screen 40 is gradually diminished as the polarizer 18 is rotated. When the polarizer 18 has been rotated to be orientated at a polarization angle of 90° difference with respect to the polarizer 24L, the image of the ARROW is no longer projected on the screen 40. This results since the light beam LB is now polarized at 90° by the polarizer 18 and is, thus, completely attenuated by the 0° oriented polarizer 24L. To develop the image of the slide 10L back on the screen 40, the polarizer 18 is rotated back to the polarization orientation of 0°. The ARROW is then gradually developed on the screen 40 with the intensity of the ARROW being a function of the cosine of the angular difference between the orientations of the polarizers 18 and 24L. Once the polarizer 18 has been rotated into alinement with the polarizer 24L, i.e., at 0° or 180° orientations, the image of the slide 10L is then again projected in full intensity, as shown in FIG. 2a, on the screen 40. As just described, the projector 1 operates as a dissolve type slide projector for developing the image of one slide on a viewing screen and dissolving it therefrom. The operation of the projection 1 is next described as lap-dissolve type slide projector wherein as the image of one slide is dissolved from a viewing screen the image of another slide is simultaneously developed in its place.

The effect of changing the orientation of the polarizers 24L and 24R by means of the control means 26 is now considered. At the moment the polarizers 18, 24L and 24R are all at 0° orientation and the polarizer 21 is at 90° orientation. Thus, the image of the slide 10L is being projected at full intensity, as shown in FIG. 2a. Selective operation of the control means 26 causes the polarizers 24L and 24R to rotate in an alined manner from 0° orientation to 90° orientation. As the polarizers 24L and 24R are rotated, the intensity of the image of the ARROW on the screen 40 is diminished, i.e., dissolved therefrom, while the intensity of the image of the slide 10R, a CIRCLE, on the screen 40 is increased, i.e., developed thereon. For example, at the instant the polarizers 24 have been rotated to 45° orientation, both the ARROW and CIRCLE are projected at equal intensities on the screen 40, as shown in FIG. 2b. Since the images of neither the ARROW nor the CIRCLE are being projected at full intensity, the ARROW and CIRCLE are shown in broken lines in FIG. 2b to illustrate this fact. Once the polarizers 24 have been rotated to 90° orientation, a full lap-dissolve transition has occurred with the ARROW completely dissolved from the screen 40 and the CIRCLE projected at full intensity thereon.

The manner in which the slide projector 1 projects the image of the slide 10R on the screen 40 is similar to its operation of projecting the image of the slide 10L thereon. The condenser means 4R provides the light beam RB for illuminating the slide 10R. The mirror 6R reflects the light beam RB from the slide 10R to the polarizer means 20. The polarizer 21 of the polarizer means 20 polarizes the light beam RB and the polarizer 24R selects the polarization of the light of the beam RB which is transmitted to the mirror 16. The mirror 16 reflects the light beam RB transmitted by the polarizer 24R and the beam-splitter 15 transmits a predetermined percentage of the intensity of the light beam RB reflected from the mirror 16 to the projection lens 30. The projection lens 30 thus projects a real and magnified image of the CIRCLE on the slide 10R on the screen 40.

With the image of the slide 10R projected at full intensity on the screen 40, a number of effects could be produced on the viewing screen 40 by rotating either the polarizers 18 or 21, or by operating the control means 26. For example, rotation of the polarizer 21 to change its polarization orientation to 0° would black out the viewing screen 40 since the polarizers 18 and 21 would be both orientated at 0° while the polarizers 24 would be oriented at 90°. If, however, instead of changing the orientation of the polarizer 21, the orientation of the polarizer 18 were changed to 90°, then both the ARROW and the CIRCLE would be projected at full intensity on the screen 40 since the polarizers 18, 21 and 24 all would be orientated at 90°. Instead of changing the polarization orientations of either of the polarizers 18 or 21, the control means 26 could be operated to cause a lap-dissolve transition to take place on the viewing screen 40 from the CIRCLE back to the ARROW. Thus, it is apparent that the operation of the projector 1 is extremely versatile.

It is noted that the light paths for the light beams LB and RB are the same length and the slides 5L and 5R are positioned symmetrically on the left and right handed sides of the projector 1. Therefore, with the projector 1 adjusted to project a focused image of the slide 10L on the screen 40, the projector 1 is also correctly adjusted to project a focused image of the slide 10R on the viewing screen 40. Thus, the images of the slides 10L and 10R are always in focus on the screen 40 as they are developed on or dissolved from the viewing screen 40.

Figure 3:
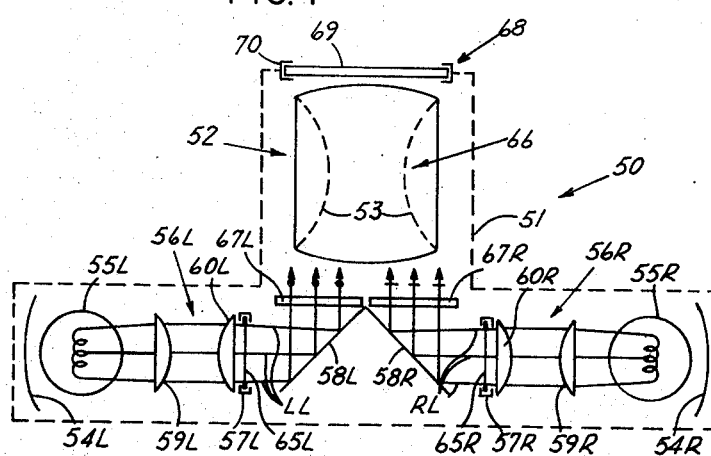
FIG. 3 is a plan view of another embodiment of slide projector according to the present invention illustrating the arrangements of the optical elements therein.

Another embodiment of a dissolve-type slide projector generally identified by the numeral 50 is shown in FIG. 3. The projector 50 has a housing 51 shown in broken lines. Mounted centrally at the front of the housing 51 is a conventional projection lens means 52. The projection lens 52 is mounted so that its optical axis extends along the centerline of the projector 50 and the effective optical path of the projection lens 52 is indicated by dashed lines designated 53.

Identical optical systems are mounted on the right and left handed sides of the projector 50 with the corresponding optical elements in each optical system being identified by the same numeral with a suffix L or R. The suffix L or R indicates whether an optical element is positioned to the left or right side, respectively, of the centerline of the projector 50. Each of these optical systems functions to form a light beam, illuminate a slide therewith and then direct the light beam to the entrance pupil of the projection lens 52. Each optical system includes a reflector 54, a lamp 55, a light condenser means 56, a slide holding means 57 and a plane mirror or reflecting means 58.

The plane mirrors 58 are each substantially totally reflecting and are mounted just to the rear of the projection lens 52 with their plane reflecting surfaces meeting on the centerline of the projector 50 and making an angle of 90° with respect to each other. Each mirror 58 is mounted at an angle of 45° with respect to the optical axis of the projection lens 52. The mirrors 58L and 58R are positioned to receive light rays from the left and right sides of the projector 50 and to direct these light rays to the projection lens 52.

Symmetrically positioned to the far left and right sides of the projector 50 on an imaginary line running at right angles to the centerline of the projector 50 from the center of the mirrors 58 are the lamps 55L, 55R and the reflectors 54L, 54R, respectively. The light reflectors 54 are placed behind the lamps 55 so that light rays from the lamps 55 are directed towards the mirrors 58. The light condensing means 56 are positioned adjacent the lamps 55 between and in line with the lamp 55 and the mirror 58 with which they are associated. The condensing means 56 each have an entrance lens 59 and an exit lens 60. The condensing means 56L and 56R are operable to produce converging light beams LL and RL, respectively. The designations LL and RL indicate left light beam and right light beam, respectively.

Mounted between the lens 60 and the mirrors 58 and adjacent to the lens 60 are the slide holding means 57. Photographic slides or transparencies 65L and 65R are shown in FIG. 3 inserted in the slide holding means or guides 57L and 57R, respectively. The guides 57 are positioned so that the image areas of the slides 65L and 65R are completely illuminated by the converging light beams LL and RL, respectively. It is here noted that light beams LL and RL are formed by the condensing means 56L and 56R so that an image of the filaments of the lights 55L and 55R are formed substantially at the aperture 66 of the projection lens 52.

The light beams LL and RL after illuminating the slides 65L and 65R are directed by the plane reflecting surfaces of the mirrors 58L and 58R, respectively, to the projection lens 52. Mounted on the housing 51 between the reflecting surfaces of the mirrors 58L, 58R and the entrance pupil of the projection lens 52 are first and second plane polarizing means 67L and 67R, respectively. The polarizing means 67L and 67R are fixedly mounted adjacent the mirrors 58L and 58R, respectively, to intercept the light beams LL and RL. The polarizing means 67L and 67R are oriented to polarize the light beams LL and RL 90° apart. The polarization of the polarizing means 67L is arbitrarily designated 0° so that the light rays of the beam LL transmitted by the polarizing means 67L are marked with dots to indicate 0° polarization. The light rays of the beam RL transmitted by the polarizer 67R are, thus, marked with crosses to indicate that their polarization angle is 90° different from the beam LL.

The projection lens 52 receives the polarized light beams LL, RL and projects these light beams so that magnified images of the slides 65L or 65R may be selectively formed on a viewing screen. In order to determine which of these slide images is projected by the projector 50, a third polarizing means 68 is mounted on the housing 51 across the exit pupil of the projection lens 52. The polarizer means 68 includes a plane polarizer element 69 rotatably mounted in mounting means or guides 70.

In operation, the projector 50 operates to provide a dissolve transition on a viewing screen from the image of the slide 65L to the image of the slide 65R, or vice versa, in substantially the same manner as the before-described projector 1. To project the image of the slide 65L at full intensity on a viewing screen, the polarizer 69 is alined with the polarizing means 67L at an angle of 0° polarization. Thereby, the 0° polarized light rays of the beam LL are projected by the projector 50 and the 90° polarized light rays of the beam RL are attenuated by the polarizer 69. By rotating the polarizer 69 from its 0° orientation gradually to a 90° polarization orientation, the image of the slide 65L formed on a viewing screen by the 0° polarized light beam LL is dissolved and the image of the slide 65R formed by the 90° polarized light beam RL is developed on the viewing screen. With the polarizer 69 positioned at 90° orientation, in alinement with the polarizing means 67R, the image of the slide 65R is projected at full intensity. Thus, the projector 50 is selectively operable to change from the projection of the image of one slide to another in a dissolve type transition.

It is here noted that in the construction of a dissolve type slide projector in accordance with the present invention a variety of modifications may be made in the optical arrangement of such a projector while still remaining in the broad concepts of the present invention. For example, the projector light source could employ one lamp as shown in the projector 1 or employ more than one lamp as in the projector 50 with or without light reflectors. Additionally, the third polarizer means which functions to determine the polarization of the light ultimately projected may comprise one or more polarizer elements and be manually or otherwise operated, as shown by the exemplary projectors 1 and 50. Further, equivalent means may be used for any of the optical components. The mirrors and beam-splitters may be replaced by suitable arrangements of prisms, light pipes or other equivalents, and the light source may be made up of lamps or other suitable means.

It is further noted that the spatial relationships between the polarizing elements with respect to each other and the light beams could be arranged in any suitable manner. Also, a plane polarizer element could be incorporated in a slide, a sliding holding means or otherwise. It is essential, however, that a light beam after being plane polarized by one polarizing element be not inadvertently polarized, such as by certain manners of reflection, if it is intended that the beam be plane polarized by a second polarizing means in order to control the intensity of the light beam projected.

Thus, there has been provided a novel slide projector which is characterized by utilizing polarized light. The projector may be constructed with selectively operable polarizing means for controlling the intensity of the image of a slide projected so that the image of a slide may be gradually developed on a viewing screen and selectively dissolved therefrom. The projector may further be constructed to project the images of one or more of several slides on a viewing screen and may be utilized to accomplish a dissolve type transition from the projection of the image of one slide on a viewing screen to the projection of the image of another slide thereon.

It is further noted that the use of the term slide projector or projector herein is in a generic sense to encompass all types of equivalent light projecting apparatus which operate to project the images of film, transparencies, photographic slides and the like. A movie projector, for example, is a special species of slide projector which operates in an equivalent manner for projecting light.

I claim:

1. A slide projector, comprising:

first and second slide holding means each for supporting a slide;

means for forming a first light beam and a second light beam, said light beam forming means being positioned to illuminate a slide supported by said first slide holding means with said first light beam and to illuminate a slide supported by said second slide holding means with said second light beam;

first polarizing means for polarizing light, said first polarizing means being positioned to be operable to polarize said first light beam;

second polarizing means for polarizing light, said second polarizing means being positioned to be operable to polarize said second light beam;

light projecting means for projecting the images of slides on a selected viewing area, said projecting means being positioned to receive both the portion of said first light beam which illuminates a slide supported by said first slide holding means and also the portion of said second light beam which illuminates a slide supported by said second slide holding means and being operable to project the received portions of light of both said first and second light beams on said selected viewing area; and third polarizing means for polarizing light, said third polarizing means being positioned to polarize said first and second light beams, said third polarizing means being selectively changeable between a position whereat its polarization orientation is aligned with said first polarizing means and out of alignment with said second polarizing means and another position whereat its polarization orientation is aligned with said second polarizing means and out of alignment with said first polarizing means whereby a dissolve type transition may be made on said selected viewing area from the projection of the image of a slide supported by one of said holding means to the image of a slide supported by the other of said slide holding means by selectively changing said third polarizing means between said position of alignment with said first polarizing means and said position of alignment with said second polarizing means.

2. The invention recited in claim 1 wherein said first, second and third polarizing means are each operable to plane polarize light.

3. Light projecting apparatus, comprising:

first and second holding means each for supporting a transparency;

means for forming a first light beam and a second light beam, said light beam forming means being positioned to illuminate a transparency supported by said first holding means with said first light beam and to illuminate a transparency supported by said second holding means with said second light beam;

first polarizing means for plane polarizing light, said first polarizing means being positioned to plane polarize said first light beam;

second polarizing means for plane polarizing light, said second polarizing means being positioned to plane polarize said second light beam;

third polarizing means said third polarizing means being a plane polarizer and positioned in the path of positioned to plane polarize said first and second light beams;

a projection lens for projecting the images of transparencies supported by said first and second holding means, said projection lens being operable to project received light on a selected viewing area;

light directing means positioned with respect to said holding means and said projection lens for directing said first light beam from said first holding means to said projection lens and said second light beam from said second holding means to said projection lens; and selectively operable means for changing the polarization orientation of said third polarizing means simultaneously relative to said first and second polarizing means between a position whereat its polarization orientation is aligned with said first polarizing means and out of alignment with said second polarizing means and another position whereat its polarization orientation is aligned with said second polarizing means and out of alignment with said first polarizing means whereby a dissolve type transition may be made on said selected viewing area from the projection of the image of a transparency supported by one of said holding means to the image of a transparency supported by the other of said transparency holding means by selectively changing said third polarizing means between said position of alignment with said first polarizing means and said position of alignment with said second polarizing means.

4. In a slide projector having a projection lens operable to project received light on a selected viewing area wherein first and second light beams are formed to illuminate first and second slides, respectively, and each of said light beams are directed to said projection lens for projecting the images of said slides on said selected viewing area, the improvement in combination therewith comprising:

a first polarizing means for plane polarizing light, said first polarizing means being positioned to plane polarize said first light beam;

a second polarizing means for plane polarizing light, said second polarizing means being positioned to plane polarize said second light beam;

a third polarizing means, said third polarizing means being a plane polarizer and positioned in the path of both said first and second light beams; and selectively operable means for changing the polarization orientation of said third polarizing means simultaneously relative to said first and second polarizing means between a position whereat its polarization orientation is aligned with said first polarizing means and out of alignment with said second polarizing means and another position whereat its polarization orientation is aligned with said second polarizing means and out of alignment with said first polarizing means whereby a dissolve type transition may be made on said selected viewing area from the projection of the image of said first slide to the image of said second slide by selectively changing said third polarizing means between said position of alignment with said first polarizing means and said position of alignment with said second polarizing means.

5. The invention recited in claim 2, including selectively operable means for changing the polarization orientations of said first, second and third polarizing means with respect to each other whereby the image of a slide supported by said first slide holding means may be developed on a viewing screen by selectively alining the polarization orientations of said first and third polarizing means and dissolved therefrom by selectively changing the polarization orientations of said first and third polarizing means to be 90° out of alinement and the image of a slide supported by said second slide holding means may be developed on the same viewing screen by selectively alining the polarization orientations of said second and third polarizing means and dissolved therefrom by selectively changing the polarization orientations of said second and third polarizing means to be 90° out of alinement.

6. The invention recited in claim 5, wherein:

said first and second polarizing means are mounted with respect to each other with their polarization orientations substantially 90° out of alinement whereby said first and second light beams are plane polarized by said first and second polarizing means, respectively, at substantially 90° apart; and said selectively operable means is operable to change the polarization orientation of said third polarizing means whereby by selectively changing the polarization orientation of said third polarizing means a dissolve type transition may be made on a viewing screen from the projection of the image of a slide supported by one of said slide holding means to the image of a slide supported by the other of said slide holding means.

7. The invention recited in claim 2, wherein:

said third polarizing means includes first and second plane polarizer elements, said first polarizer element being positioned to polarize said first light beam and being mounted to be rotatable with respect to said first light beam, said second polarizer element being positioned to polarize said second light beam and being mounted to be rotatable with respect to said second light beam; and including:

selectively operable means connected to said polarizer elements for rotating said polarizer elements together whereby the planes in which said first and second light beams are polarized by said first and second polarizer elements, respectively, may be selectively and simultaneously changed.

8. The invention recited in claim 7, wherein:

said first polarizing means is mounted to be selectively rotatable with respect to said first light beam whereby the plane in which said first light beam is polarized by said first polarizing means may be selectively changed; and said second polarizing means is mounted to be selectively rotatable with respect to said second light beam whereby the plane in which said second light beam is polarized by said second polarizing means may be selectively changed.

9. The invention recited in claim 7, wherein:

said first and second polarizing means are fixedly mounted each at a predetermined polarization orientation; and said first and second polarizer elements of said third polarizing means are orientated with one of said polarizer elements 90° out of alinement with its associated one of said first and second polarizing means when the other one of said polarizer elements is in alinement with its associated one of said first and second polarizing means whereby by selectively rotating said first and second polarizer elements a dissolve type transition may be made on a viewing screen from the projection of the image of a slide supported by one of said slide holding means to the image of a slide supported by the other of said slide holding means.

10. The invention recited in claim 2, wherein said light projecting means includes:
a projection lens;
first light directing means positioned with respect to said first slide holding means and said projection lens for directing said first light beam from said first slide holding means to said projection lens; and
second light directing means positioned with respect to said second slide holding means and said projection lens for directing said second light beam from said second slide holding means to said projection lens.

11. The invention recited in claim 2, wherein said light projecting means includes:
a projection lens; and
light directing means positioned with respect to said slide holding means and said projection lens for directing said first light beam from said first slide holding means to said projection lens and said second light beam from said second slide holding means to said projection lens, said light directing means including beam-splitting means, said beam-splitting means being operable to reflect one of said light beams to said projection lens and to transmit the other of said light beams to said projection lens.

12. The invention recited in claim 2, wherein said light projecting means includes:
a projection lens;
first mirror means positioned with respect to said first slide holding means and said projection lens for directing said first light beam from said first slide holding means to said projection lens; and
second mirror means positioned with respect to said second slide holding means and said projection lens for directing said second light beam from said second slide holding means to said projection lens.

* * * * *